Sept. 22, 1959  J. F. BLACK ET AL  2,905,825
METHOD AND APPARATUS FOR MEASURING SPECIFIC ACTIVITY
OF RADIOACTIVE MATERIALS IN SMALL QUANTITIES
Filed Dec. 7, 1955

James F. Black
Eric O. Forster    Inventors

By *[signature]* Attorneys

United States Patent Office 2,905,825
Patented Sept. 22, 1959

2,905,825

METHOD AND APPARATUS FOR MEASURING SPECIFIC ACTIVITY OF RADIOACTIVE MATERIALS IN SMALL QUANTITIES

James F. Black, Roselle, and Eric O. Forster, Scotch Plains, N.J., assignors to Esso Research and Engineering Company, a corporation of Delaware Application December 7, 1955, Serial No. 551,541

8 Claims. (Cl. 250—83)

The present invention relates to an apparatus for measuring specific activity of small quantities of radioactive materials. It is particularly intended to facilitate the measurement of specific radioactivity of very small samples of radioactive isotopes or of materials containing radioactive substances. It has a specific application to the testing of various materials containing radioactive tracers and the like, but is not limited thereto.

A primary object of the invention is to facilitate the accurate measurement and comparison of radioactive materials which are available only in very small quantities or which, because of high radiation intensities, are dangerous to handle in quantities of the order usually employed for measurement. A further object is to facilitate the use or application of radioactive substances to testing of other materials. For example, it may be used for rapid testing of radioactive tracers used in the preparation of various materials of commerce for the purpose of obtaining superior uniformity, homogeneity, dispersion, etc., or for related properties.

In the prior art, it has become a standard practice to insert tracer amounts of radioactive materials into systems where other materials are mixed, consumed, distributed or otherwise processed. By measuring the tracers at various points or in various products or parts of products, it has been found possible to improve the quality, uniformity or other properties to a measurable extent. However, some difficulties have been encountered in handling and/or tracing the radioactive material with the desired degrees of accuracy and with safety.

Ordinarily, specific radioactivity of materials is determined by measuring the activity of accurately weighed or measured samples of such materials. These customarily must be of uniform thickness, density, or the like for comparison with standard samples to determine dispersion, contamination or other process variables. Such sampling has required careful handling, weighing, etc. of suitable quantities, usually substantial quantities of radioactive test material, usually of the order of grams. It has also required that relatively large exposed areas of the radioactive substance be made available for activity measurements. For accuracy, corrections normally must be made for thicknesses of films, layers, or other samples. Obviously, a much simpler and more accurate determination is one in which the thickness of the layer or sample is irrelevant. According to the present invention, it is possible to use very small samples, of the order of milligrams, and to substantially ignore film thicknesses, etc. with improved accuracy in test results. By this means, small test samples may be directly compared rapidly, accurately and without substantial handling. Without weighing, spreading thin films, measuring thickness of films and the like, it becomes possible accurately and directly to determine the specific activity of each sample.

A further application of this invention relates to the production of large masses of organic materials. As one example, lubricating grease of uniform quality may be produced in large batches or quantities by a simple adaptation of the present invention. Other batch mixes of various constituents can be tested likewise.

The invention will be more fully understood by referring to the attached drawing which forms a part of this specification.

Figure 1:
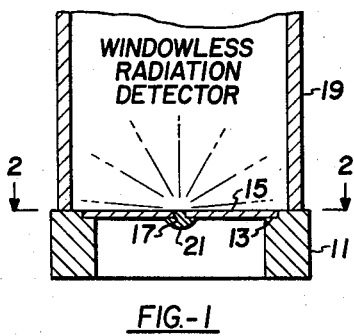
Fig. 1 shows an enlarged transverse sectional view of a simple sampling apparatus as used in a windowless radiation detector. This figure is taken substantially along line 1—1 of Fig. 2.

Referring now to Fig. 1, there is shown an annular member, preferably of metal such as aluminum, brass, iron or lead indicated at 11. It is recessed at 13 to receive a small thin disc 15 which fits neatly into the recess. This disc may be of any material suited to the intensity of radiation. For soft or beta radiation, a thin disc of aluminum, sheet iron, or even of plastic may be quite adequate so long as it substantially cuts off radiation. For more intensely radioactive materials, the disc should be of denser metal and of greater thickness; for example, it should be composed of lead or other heavy metal where such is required to substantially cut off the radiation.

Figure 2:
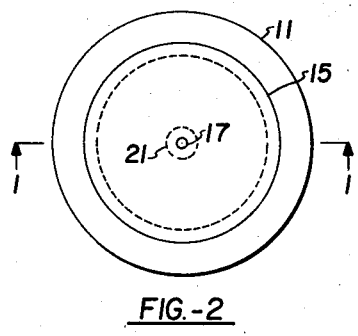
Fig. 2 is a transverse horizontal view of the apparatus of Fig. 1 taken substantially along the line 2—2 of Fig. 1.

The disc 15, as best shown in Fig. 2, is provided with a small opening 17 of accurately predetermined size. In some of the actual experiments, this opening was approximately $\frac{1}{32}''$ in diameter but its size obviously may be varied, for example, from $\frac{1}{8}''$ to $\frac{1}{64}''$. In a series of tests, discs of similar material and with openings 17 of identical size are provided for comparative testing of micro quantities of radioactive substances.

For materials of low radiation intensity, or soft radiation, the unit 11 with disc 15 may be inserted directly in a windowless radiation detector such as the detector tube 19 of a Geiger counter, or in the detector of a scintillation counter. In this way, all of the radiation from the opening 17 enters the detector and can be measured. All other radiation from the test sample is cut off by the disc. This arrangement has the advantage that the area of radiation can approximate the hemispherical area $2\pi d$, where $d$ is the diameter of the opening through which radiation is passed.

Radioactive material to be tested is indicated at 21. A small quantity, for example, 0.1 milligram or so, is placed on the opposite side of the disc and pressed into the opening to substantially fill the latter. It should not extrude through the disc 15 and must not be wiped across the upper face of the disc so as to spread around the opening on the upper side of this disc. Otherwise radiation would be greatly enhanced and give inaccurate readings, even with a careful attempt to remove the surplus. With this arrangement, very small quantities of even very weakly radioactive materials or compounds, such as those containing $S^{35}$, $C^{14}$, $H^3$, or $P^{34}$ in high dilution may be accurately detected and their radiation measured. At the same time their radiation around the opening, primarily beta radiation, is quite completely cut off by the thin disc 15. Even plastic material or paper of card thickness will frequently be adequate to cut off superfluous radiation with very weak radiators.

By using sampling discs 15 of the same material, and with openings 17 of uniform size, the test results are highly reproducible. Standard test samples may be used for comparison with excellent reliability in the measurements of specific radioactivity. The disc 15 blocks all radiation from the sample outside the opening 17. The material in the opening has the required "infinite thickness" required. See Friedlander and Kennedy, "Introduction to Radiochemistry," pp. 228–234.

Similar principles are applied to the measurement of more intensive radiation and to the measurement of materials which are dangerous to handle in substantial quantities. For such purposes, the disc 15 may be placed below rather than above the annular ring 11 and thereby spaced from the detector. This can be accomplished by a simple inversion of members 11 and 15, taking care, of course, to place the material to be measured on that side of disc 15 away from the detector 19.

Figure 3:
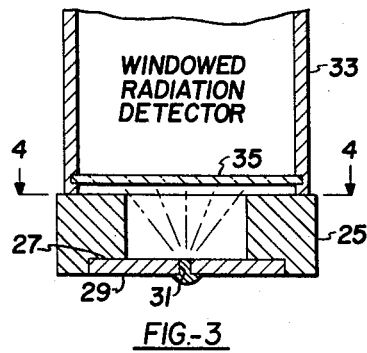
Fig. 3 is a sectional view in elevation of a sampling apparatus suitable for use with material having a high radiation intensity. This view is taken along line 3—3 of Fig. 4 looking in the direction of the arrows.
Figure 4:
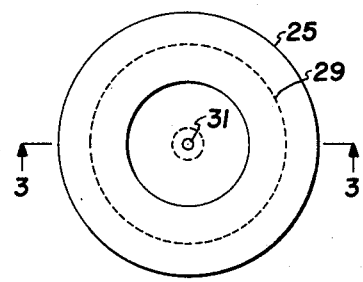
Fig. 4 is a horizontal view of the apparatus in Fig. 3, taken along line 4—4.

In Figs. 3 and 4, modified apparatus is shown for measuring specific radiation of greater intensities. It is particularly applicable to the measurement of such materials as radium, iodine$^{132}$, cobalt$^{60}$, iron$^{59}$, strontium$^{90}$ and the like. These materials emit gamma or "hard" radiation which would readily penetrate a thin light disc of metal such as 15, Fig. 1. Hence, a heavy annular member 25 of lead or other dense metal is provided. It is recessed at 27 to receive a suitable disc 29. The latter may be of lead or other suitable material adequate for shielding and suitable for detection purposes. Material for disc 29 will be chosen to suit the kind and intensity of radiation as will be obvious to those skilled in the art. This member 29 is provided with a small accurately sized opening 31 and the substance to be tested is placed on the lower side of the disc, away from the measuring instrument. The sample may be pressed into the opening 31 but should not protrude through it or be spread around the opening on the upper side of disc 29.

For radiation of high intensity, a standard windowed radiation detector 33 may be used, the gamma radiation readily penetrating the window 35. Of course, for radiation of lower or intermediate intensity, the windowless detector may be desirable.

Figure 5:
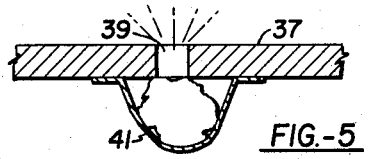
Fig. 5 shows an adaptation for the measurement of radiation from a small solid mass of radioactive material.

Referring to Fig. 5, a disc 37, comparable to discs 15 and 29 is provided with a small central opening 39. The disc or plate should be drilled accurately so that the size of the opening is closely controlled. Where a solid radioactive substance is to be tested, it may be taped to the plate by suitable adhesive tape 41 or it may be cemented to the disc. The material and thickness of disc 37 should be suitable for the type of radiation under study, i.e. it should afford complete shielding except for the opening. By comparing its radiation through the opening with that of standard samples of known radioactivity through a similar opening, specific radioactivity may be determined accurately.

Figure 6:
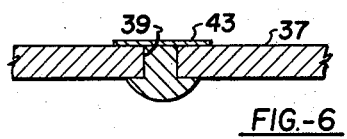
Fig. 6 shows a fragmentary view of a system for applying small quantities, of radioactive material to be tested to a disc for determination of specific radioactivity of such material.

In Fig. 6, another method of applying the substance to be tested to the supporting disc is indicated. Here, an adhesive tape or film 43 is secured to the upper face of a disc 37 to cover the opening 39. Material to be tested is pressed into the opening 39 and against the tape. If this material is viscous or plastic, it will remain in place and the tape 43 may be removed. For highly radioactive samples, the tape need not be removed, since it offers no substantial barrier to passage of gamma rays. For softer radiation, it should preferably be removed. If of identical thickness on all samples to be compared, the tape may be left on where it does not greatly reduce radiation. For finely divided solid materials, the hole 39 may be filled and a tape placed over the bottom to keep the radioactive material from falling out during the test. When the film 43 is removed, care should be taken not to spread the radioactive material over the upper face of plate 37. It should be emphasized that only a few milligrams of the material to be tested are needed. In lieu of grease, other semi-solids may be tested, also liquids such as oil blends, fuels, and/or solids of any type. For instance, a very thin lubricating film, oil or grease, on a metal surface may be tested by applying the metal, or a piece thereof, to the test disc, only a pin-hole area being exposed. This mechanism may be used indirectly for measuring film thickness, e.g. of grease, oil, lacquer, etc.

Referring now to Table I there are shown results obtained in testing the dispersion of radioactive iodine$^{132}$ through lubricating greases.

TABLE I

*Determination of the extent of mixing*

Test #2.
Kettle: Pilot plant.
Speed of paddles: 43 r.p.m.
Charge: 200 lbs. of a 0 grade grease.
Temperature of grease: 78° F.

| Time | Operation | Sample location in kettle | Activity | Actual | Theoretical [1] | Percent mixing |
|------|-----------|---------------------------|----------|--------|-----------------|----------------|
| 10:40 | Add I$^{132}$ | | | | | |
| 10:41 | Stirred for 1 minute | | | | | |
| 10:42 | Sampling | Top | 1.0 | 15,221 | 15,221 | 26.4 |
| 10:45 | do | Bottom | 0.97 | 3,897 | 4,017 | |
| 10:48 | Stirred for another minute | | | | | |
| 10:55 | Sampling | Bottom | 0.933 | 3,377 | 3,620 | } 28.8 |
| 10:58 | do | Top | 0.920 | 11,572 | 12,579 | |
| | 4 1-minute mixings | | | | | |
| | 2 2-minute mixings with samples | | | | | |
| 12:16 | Stirred for 2 minutes | | | | | |
| 12:19 | Sampling | Bottom | 0.620 | 4,495 | 7,251 | |
| 12:22 | do | Top | 0.610 | 4,514 | 7,401 | |
| 12:27 | do | Left wall | 0.595 | 4,475 | 7,521 | 95.3 |
| 12:31 | do | Right wall | 0.585 | 4,685 | 8,008 | |
| 12:34 | do | Center top | 0.575 | 4,475 | 7,783 | |
| 12:36 | do | Center bottom | 0.570 | 4,505 | 7,903 | |

[1] Theoretical count/min. = actual count/min. divided by activity. Total time of stirring, 12 minutes. Theoretical activity per sample at 100% mixing, 7650±85 c./m.

NOTE.—I$^{132}$ has a half life of 140 minutes.

In an actual operation, a sizeable batch of lubricating grease, consisting mainly of lubricating oil and soaps of higher fatty acids, etc. was stirred mechanically in a conventional grease kettle. A very small amount (10 millicuries) of the radioactive material (I$^{132}$) was placed in the kettle and mixing was continued for a predetermined period of time. Periodic tests were taken until micro samples, taken from various places in the kettle, showed substantial uniformity.

In another experiment, sulfur[35] was used as the radioactive isotope to trace the movement of lubricant in a bearing. Half of the bearing was packed with lubricant containing the $S^{35}$, the other half with lubricant free of it. The bearing was run for various time periods and the distribution of radioactive material was followed, using the test apparatus of Fig. 1.

A different type of experiment involved the determination of the tenacity with which a lubricant in general, and one of its constituents in particular, adhered to a metallic surface such as is found in a bearing. A grease was prepared containing sodium stearate tagged with radioactive carbon[14]. This grease was rubbed on a stainless steel surface and its radioactivity measured. The surface was then rinsed with various organic solvents such as a petroleum solvent ("Varsol"), naphtha and carbon tetrachloride. The radiation was measured at the end of each treatment, using the apparatus of Fig. 1, except that a lead shielded scintillation counter was used instead of the windowless Geiger counter, because it allowed greater freedom in measuring various areas of the treated surface exposed through the small opening in the disc 15.

Figure 7:
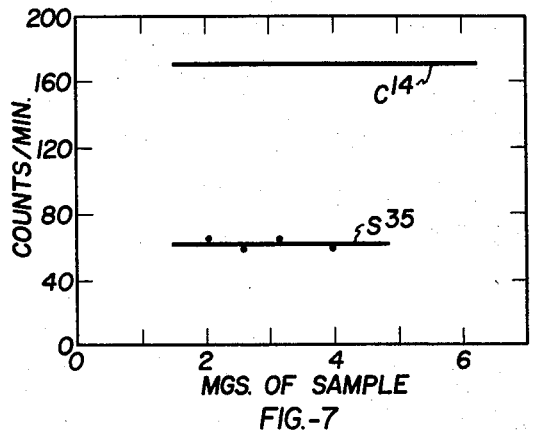
Fig. 7 is a graph showing the essentially complete independence of the sample mass and the accurate measurement of its radioactivity.

In all cases tested, no particular attempt was made to obtain samples of uniform size. Samples as small as 0.1 milligram or less, and as large as several milligrams, showed identical results when used with a stainless steel disc of about 0.02" thickness containing a $\frac{1}{32}$" perforation as shown in Fig. 7.

Figure 8:
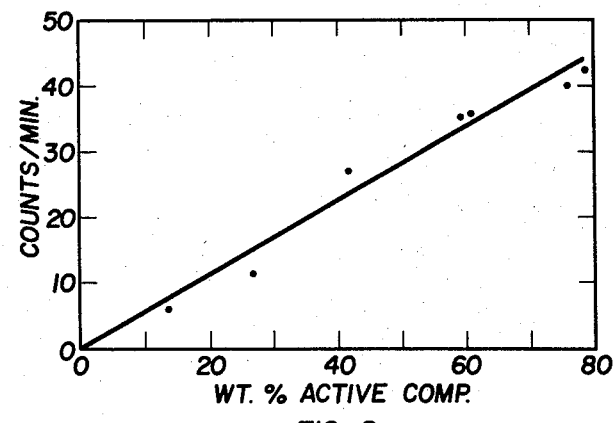
Fig. 8 is a graph showing the linear relationship between the concentration of radioactive material in a sample and the radioactivity of such sample.

Addition of increasing amounts of radioactive material to grease containing no radioactive substance produced a linear increase in the counting rate, as shown in Fig. 8. This indicates that the relation between the percentage of active component and the observed counting rate was stricitly linear.

It should be obvious that variations in the process and in the apparatus can be made within the spirit of the invention. While a specific description of a grease preparation process has been included, it can be understood that the testing process has wide application to various manufacturing processes. It may be applied to production and blending of asphalt and other fluid, semi-solid or solid hydrocarbon products. It is applicable also to the testing of finely divided solids such as cracking catalysts, coke, and other solids of small particle size where tracers are added. It has application to central lubrication systems where the travel of oil and grease, etc., at various points can be accurately checked by determining concentration of tracers. It has obvious application to dispersion and dissemination of other materials. In other industries wherever micro quantities of isotopes need to be used for test purposes, or for any purpose, the same process may be employed.

What is claimed is:

1. A method of measuring the specific radioactivity of a sample of material of the order of milligram quantities or less, containing a radioactive tracer composition which comprises placing over an accurately measurable opening in a small plate of radioactive shielding substance, a small unmeasured quantity of said material, sufficient to cover the area of said opening and directly measuring the specific radiation activity from said opening.

2. The method of determining the specific radioactivity of a solid radioactive sample, which comprises attaching said solid sample to the rear face of a shielding plate having an accurately sized opening therein through which radiation may pass freely, said sample being attached to said face substantially to cover said opening measuring radiation emitted by said sample through said opening, and comparing the measured radiation with radiation through a similar opening in a similar plate of a standard sample of known specific radioactivity.

3. The method of measuring specific activity of a radioactive material without allowance for thickness, density and other characteristics normally influencing the accuracy of such measurement, which comprises applying a small unmeasured quantity of said radioactive material, to close one end of a diametrically restricted, open ended passageway through a sheet of material shielding against radiation emitted by said radioactive material, said small quantity of radioactive material being substantially limited to that required to close said passageway end, and measuring radiation emission of said radioactive material through the opposite end of said passageway.

4. An apparatus for measuring specific radioactivity of small indiscriminate sample portions of radioactive substances, wherein said indiscriminate portions are of the order of a milligram or less, comprising a holder formed of a material susbtantially impervious to radiation emitted by said substances, a disc-like sheet of a material substantially impervious to radiation emitted by said substances, said disc having obverse and reverse surface portions, an accurately sized passageway defined in said disc to open through each of said surface portions, a recess defined in said holder including a shouldered portion adapted to receive and engage said disc circumferentially of one said surface portion, and wherein said disc reverse surface portion is adapted to receive and support one of said sample portions substantially as a closure for the end of said passageway opening through said disc reverse surface portion.

5. An apparatus according to claim 4, wherein said holder is a vertically disposed cylindrical member, and said shouldered portion is in the upper end of said holder to receive and engage said disc reverse surface portion.

6. An apparatus according to claim 4, wherein said holder is a vertically disposed cylindrical member, and said shouldered portion is in the lower end of said holder to receive and engage said disc obverse surface portion.

7. An apparatus according to claim 4, wherein said holder is a heavy metal shield and said recess is accurately sized and is deep enough to obtain accurate specific radiation readings for gamma radiation.

8. An apparatus according to claim 4 wherein said holder and disc are adapted to fit into the detector of a windowless radiation counter for accurate determination of low intensities of radiation.

References Cited in the file of this patent
UNITED STATES PATENTS

| | | |
|---|---|---|
| 1,748,403 | Wentworth | Feb. 25, 1930 |
| 2,332,873 | Silverman | Oct. 26, 1943 |
| 2,467,812 | Clapp | Apr. 19, 1949 |
| 2,681,415 | Liston | June 15, 1954 |
| 2,757,290 | Jacobs et al. | July 31, 1956 |

OTHER REFERENCES

"Radioactive Isotopes as Tracers," Kramer, Power Plant Engineering, November 1947, pages 105–109.

"Characteristic X-Rays from Thick Beta-Ray Sources," by Tiden et al., from Arkiv for Fysik, Band 7 nr 18, communicated June 3, 1953, pages 193–196.

"Photon Counters for the FAR Ultraviolet," Chubb et al., Microautoradiography, pages 493–498.